(12) United States Patent
Schrand

(10) Patent No.: US 6,902,506 B2
(45) Date of Patent: Jun. 7, 2005

(54) LIMITED SLIP DIFFERENTIAL WITH INTEGRATED SOLENOID VALVE AND PLENUM

(75) Inventor: E. Vincent Schrand, Farmington Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/640,164

(22) Filed: Aug. 13, 2003

(65) Prior Publication Data

US 2005/0037885 A1 Feb. 17, 2005

(51) Int. Cl.[7] .............................................. F16H 48/20
(52) U.S. Cl. .......................... 475/86; 475/88; 475/231; 475/233; 475/150; 475/116; 192/85 AA; 192/103 F; 251/50; 137/540
(58) Field of Search ........................... 475/86, 88, 231, 475/233, 150, 116; 192/85 AA, 103 F; 251/50; 137/540

(56) References Cited

U.S. PATENT DOCUMENTS

| | | | |
|---|---|---|---|
| 5,984,259 A | * | 11/1999 | Najmolhoda et al. .......... 251/50 |
| 6,164,322 A | * | 12/2000 | Najmolhoda et al. ....... 137/540 |
| 6,183,387 B1 | | 2/2001 | Yoshioka |
| 6,283,885 B1 | | 9/2001 | Irwin |
| 6,342,022 B1 | | 1/2002 | Sturm |
| 6,413,182 B1 | | 7/2002 | Yates, III et al. |
| 6,692,396 B1 | * | 2/2004 | Grogg et al. .................. 475/86 |
| 6,699,151 B2 | * | 3/2004 | Grogg et al. .................. 475/88 |
| 6,733,411 B1 | * | 5/2004 | Kaplan et al. ................. 475/88 |

* cited by examiner

*Primary Examiner*—Richard M. Lorence
*Assistant Examiner*—David D. Le
(74) *Attorney, Agent, or Firm*—Thomas A. Jurecko

(57) ABSTRACT

An apparatus and method for controlling a limited slip differential uses a solenoid operated valve having an armature attached a differential case of the differential for rotation therewith, and an actuating coil operatively attached to a non-rotating differential housing, for modulating pressure in a hydraulically actuated limited slip device of the limited slip differential. The actuating coil is mounted on a non-rotating plenum, sealed to the differential case with low pressure dynamic seals.

13 Claims, 3 Drawing Sheets

LIMITED SLIP DIFFERENTIAL WITH INTEGRATED SOLENOID VALVE AND PLENUM

TECHNICAL FIELD OF THE INVENTION

This invention relates to limited slip differentials, and more particularly to a solenoid valve and plenum apparatus for use in limited slip differentials.

BACKGROUND OF THE INVENTION

Differentials have been used in the drive systems of wheeled vehicles for many years, to allow the wheels on opposite sides of the vehicle being driven by a common drive shaft to rotate at different speeds while the vehicle is making a turn, so that the outer wheel is not forced to skid on the driving surface as the vehicle negotiates the turn. Differentials also allow wheels of different diameters to be driven by a common drive shaft without skidding one or the other of the wheels, so that a vehicle may be operated with a partially deflated tire, or with a compact spare.

In a typical differential, the wheels on either side of the vehicle are driven by separate axle shafts joined at an inner end by the differential. The inner end of each axle engages its own side gear, and the side gears are connected together by planet gears mounted inside of a rotating differential case, that is in turn mounted in a non-rotating differential housing. The differential case is connected through a ring and pinion gear arrangement to be rotated by a drive shaft connected to the vehicle engine through a transmission or similar drive train component.

This gearing arrangement allows the wheels to turn at different speeds with respect to one another, while being driven by the drive shaft, which is turning at a constant speed. The sum of the speeds of the wheels remains constant, so that as the inside wheel slows down during a turn and the outside wheel speeds up, due to the difference in the distance that the wheels must travel to traversing the turn, the sum of the speeds of the wheels will remain a constant value. If one of the wheels should start to slip, or spin, however, the differential will allow the other wheel to slow down by a proportionate amount, or even stop altogether with the slipping wheel spinning at twice the speed it would be turning if both wheels were driving the vehicle straight ahead without slipping. In such circumstances, traction is greatly reduced or lost altogether, and the vehicle can become stuck.

To address this problem, a special type of differentials, known as limited slip differentials have been utilized for many years in wheeled vehicles for controlling the degree to which the wheels on opposite sides of the vehicle can vary from one another. A typical limited slip differential includes a hydraulically actuated friction clutch pack that is actuated to retard relative rotation of at least one of the side gears of the differential, relative to the rotation of a differential case in which the side gears are mounted. Normally, hydraulic pressure for actuating the clutch pack is generated within the differential, in a manner that results in pressure being increased or decreased in direct proportion to an increase or decrease in the speed of the side gears with respect to the differential case.

To provide the pressure for actuating the clutch pack, a limited slip differential often includes a gerotor pump having an inner gear attached to one of the side gears, and an eccentrically mounted outer gear rotating within the differential case. Whenever the side gear is rotating, the pump generates a pressurized flow of hydraulic fluid to a piston chamber in the case having a piston that clamps clutch disks together in the clutch pack to retard relative rotation between the side gear and the case.

Historically, pressure in the piston chamber, and clamping force generated by the piston, have been controlled with a spring biased pressure relief valve mounted in the differential case and a flow-controlling orifice. The relief valve and orifice are traditionally placed in a series fluid circuit relationship to one another in a fluid passage providing an outlet for fluid in the piston chamber.

When hydraulic pressure reaches a predetermined value, the pressure relief valve opens and begins to release a portion of the fluid being pumped into the piston chamber by the pump, through the flow-controlling orifice. The fluid released by the relief valve is preferably collected in a non-rotating plenum that directs the fluid back to the pump inlet for re-circulation through the piston chamber. As the fluid passes through the relief valve and flow-controlling orifice, the pressure drops from a high pressure inside the piston chamber to a low pressure in the plenum, thus allowing the plenum to be sealed to the differential case with low pressure dynamic seals. U.S. Pat. No. 6,283,885 B1 to Irwin, U.S. Pat. No. 6,342,022 B1 to Sturm, and U.S. Pat. No. 6,413,182 B1 to Yates III, et al, illustrate this approach.

While using a relief valve in this manner works well, this approach suffers from a disadvantage in that the hydraulic pressure release characteristic of the relief valve is fixed by the valve spring rate and component design, and cannot be varied while the differential is operating. In order to change the relief valve setting, the differential must be disassembled so that the relief valve components can be changed.

In modern vehicles having sophisticated controlled braking systems for improving traction and stability of the vehicle, it is highly desirable to have the capability for totally disengaging and/or changing the operating characteristics of the limited slip differential during operation of the vehicle.

In one approach to providing a capability for disengaging and/or changing the operating characteristics of the limited slip differential during operation of the vehicle, an actuating mechanism located inside or outside of the differential housing is connected to a relief valve of the type described above, for adjusting the spring rate of the valve during operation of the vehicle. The actuating mechanism may be driven electrically, or by other mechanical, hydraulic, pneumatic or vacuum powered actuators. An example of this approach using an actuating mechanism having a fork shift mechanism is disclosed in U.S. Pat. No. 6,183,387 B1 to Yoshioka. Using an actuating mechanism, such as the one disclosed in Yoshioka, is undesirable, however, in that it requires a complex and bulky linkage, and does not include a plenum for efficient control of the fluid released by the relief valve.

In other approaches, the relief valve inside the differential housing is eliminated through the use of a solenoid operated flow control valve. An example of this approach is provided by a commonly assigned US patent application Ser. No. 10/309,219 to Schrand, et al,. In some embodiments of this approach, a plenum includes a high pressure cavity connected via an open fluid passage to the piston chamber, and sealed to the differential case with high pressure dynamic seals. The solenoid operated valve is installed in the plenum at an outlet of the high pressure cavity and releases fluid into the interior of the differential housing.

While using a solenoid operated valve located on the plenum, rather than on the differential case, offers considerable improvement over the approach disclosed in Yoshioka, and generally works well, it would be desirable to eliminate the need for high pressure seals between the plenum and the differential case. Having the solenoid operated valve located on the plenum also requires that the differential housing be larger to provide room for the solenoid portion of the valve.

What is needed, therefore, is an improved apparatus and method for controlling a limited slip differential.

SUMMARY OF THE INVENTION

My invention provides an improved apparatus and method for controlling a limited slip differential through the use of a solenoid operated valve having an armature attached to a differential case of the differential for rotation therewith, and an actuating coil operatively attached to a non-rotating differential housing, for modulating pressure in a hydraulically actuated limited slip device of the limited slip differential. The actuating coil may be mounted on a non-rotating plenum, sealed to the differential with low pressure dynamic seals.

In one form of my invention, the differential case includes an outlet passage for the hydraulically actuated limited slip device, and the solenoid operated valve includes valve components for selectively modulating fluid flow through the outlet passage as a function of electrical current passed through the actuating coil. The valve components may include a valve seat in the outlet passage, a ball retained in the outlet passage adjacent the seat and configured for seated engagement with the valve seat, and a push rod affixed to the armature for movement therewith and extending through the outlet passage, for sliding movement with respect thereto, and contacting the ball for regulating a position of the ball in relation to the valve seat.

The differential may further include a retaining device attached to the differential case for retaining the push rod in the outlet passage, and a preload spring operatively disposed between the retaining device and the push rod for urging the push rod toward a preload position in the outlet passage. The preload position may be configured to provide either a normally open or a normally closed solenoid operated valve, to meet the needs of various embodiments of my invention.

My invention may also take the form of a method for operating a limited slip differential, by modulating pressure in the hydraulically actuated limited slip differential with a solenoid operated valve having an armature attached to the differential case for rotation therewith, and an actuating coil attached to a non-rotating support for actuating the armature, in a differential having a differential gear assembly mounted within a rotatable differential case and adapted for attachment to a pair of output shafts for allowing differential rotational speed between the output shafts, and a hydraulically actuated limited slip device disposed within the differential case for retarding differential rotational speed between the output shafts.

The foregoing and other features and advantages of my invention will become further apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION

Figure 1:
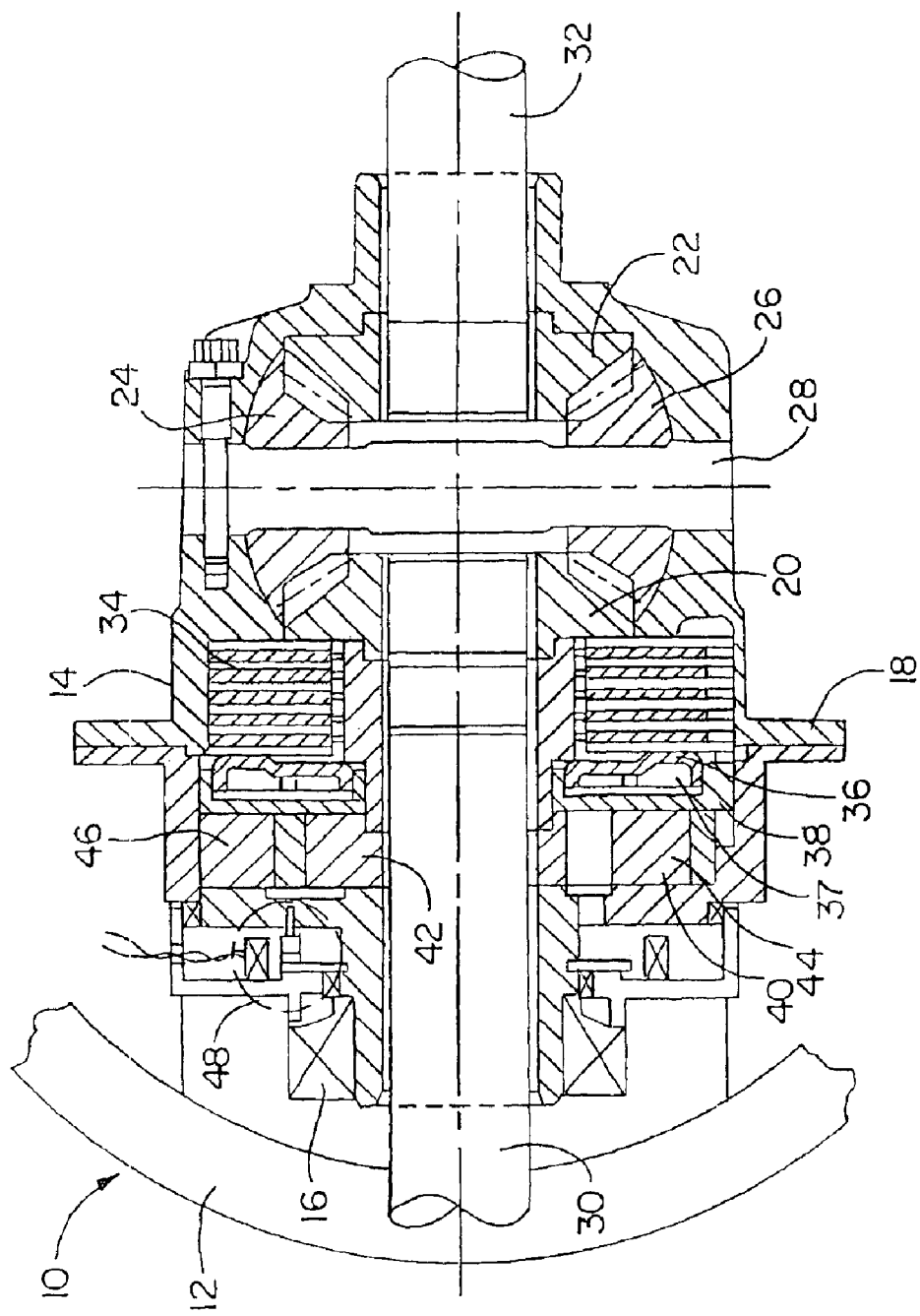
FIG. 1 is a cross section of an exemplary embodiment of a limited slip differential, according to my invention, having a solenoid operated valve according to my invention as indicated within the circle designated '48'.
Figure 2:
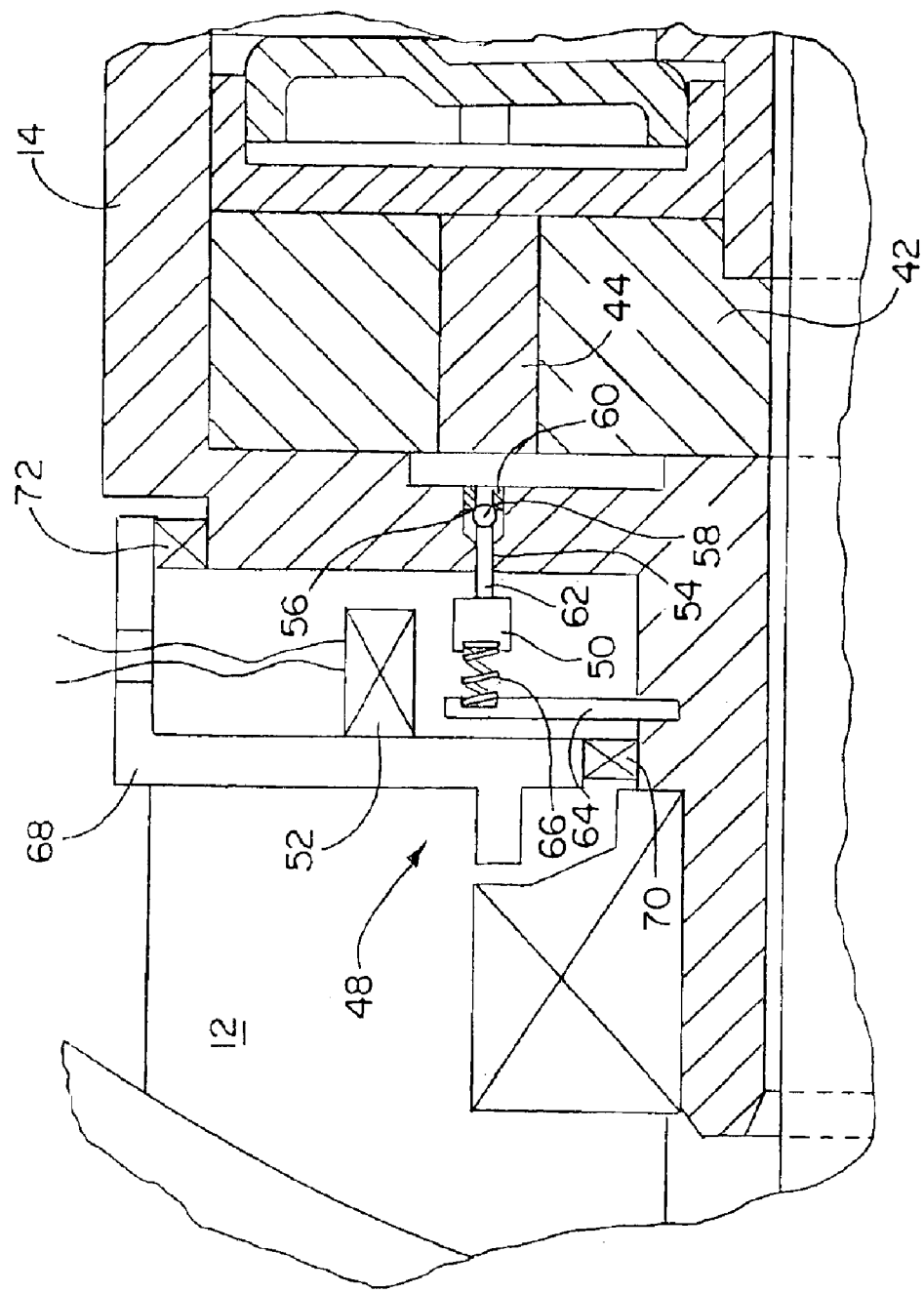
FIG. 2 is an enlarged partial cross section of a first exemplary embodiment of my invention taken around the circle '48' of FIG. 1, having the solenoid operated valve located in the differential case at a point adjacent the intersection of the inner and outer gears of a gerotor pump.

FIGS. 1 and 2 depict a first exemplary embodiment of an electrically controlled limited slip differential 10, according to my invention. The differential 10 includes a non-rotating differential housing 12, and a differential case 14 rotatably mounted within the housing 12 by a pair of bearings 16, only one of which is shown, and adapted to be driven by an input shaft (not shown) through a ring gear (not shown) attached to a flange 18 extending outward from the differential case 14.

A differential gear assembly mounted within the differential case 14 includes a pair of side gears 20, 22, a pair of pinion gears 24, 26 and a pinion shaft 28, attached to a pair of output shafts 30, 32, for allowing differential rotational speed between the output shafts 30, 32, in a manner commonly known in the art.

A hydraulically actuated limited slip device includes a clutch pack 34 disposed between one of the side gears 20 and the differential case 14. A plurality of friction discs is alternately splined onto the side gear 20 and differential case 14. A hydraulically actuated piston 36 disposed within a piston chamber 37 of a piston housing 38, serves to compress the clutch pack 34 and retard any speed differential between the output shafts 30, 32.

A gerotor pump 40 provides pressurized hydraulic fluid for actuating the piston 36 and engaging the clutch pack 34. The gerotor pump 40 includes an inner gear 42 adapted for attachment to one of the output shafts 30 for rotation therewith, and an outer gear 44 rotatably mounted within an eccentric spacer 46 attached to the differential case 14 to thereby allow rotation of the outer gear 44 relative to the inner gear 42 and the differential case 14 within the eccentric spacer 46. As the relative speed of the output shafts 30, 32 increases, the gerotor pump 40 pumps fluid to the piston chamber 37, to actuate the clutch pack 34. As speed increases, pressure in the piston chamber 37 increases.

To modulate pressure in the piston chamber 37, for adjusting the clamping force generated by the piston 36, the differential 10 includes a solenoid operated valve 48 having an armature 50, as shown in FIG. 2, attached to the differential case 14 for rotation therewith, and an actuating coil 52 operatively attached to the non-rotating differential housing 12. In the first embodiment, as shown in FIGS. 1 and 2, an outlet passage 54 for the hydraulically actuated limited slip device is disposed adjacent an intersection of the inner and outer gears 42, 44 of the gerotor pump 40.

The solenoid operated valve 48 includes valve components in the form of a ball 58 retained in the outlet passage by an orifice plug 60 including a seat 56 for receiving the ball 58. The ball 58 is configured for seated engagement with the valve seat 56. A push rod 62, affixed to the armature 50 for movement therewith, extends through the outlet passage 54 for sliding movement with respect thereto, and contacts the ball 58 for regulating the position of the ball 58 within the outlet passage 54 in relation to the valve seat 56.

A retaining ring 64 is attached to the differential case 14 for retaining the push rod 62 in the outlet passage 54. A preload spring 66 is operatively disposed between the retaining ring 64 and the armature 50 for urging the push rod 62 toward a preload position in the outlet passage 54.

A plenum 68 for hydraulic fluid is attached to and fixed against rotation in relation to the differential housing 12, and sealed with a pair of annular low pressure seals 70, 72 to the differential case 14 in fluid communication via the intersection of the gears 42, 44 of the gerotor pump, with the piston chamber 37 of the hydraulically actuated limited slip device, for receiving fluid from the solenoid operated valve 48. The actuating coil 52 of the solenoid operated valve 48 is fixedly attached to the plenum 68 for selectively modulating fluid flow through the outlet passage 54 by moving the armature 50, push rod 62 and ball 58, as a function of electrical current passed through the actuating coil 52.

Figure 4:
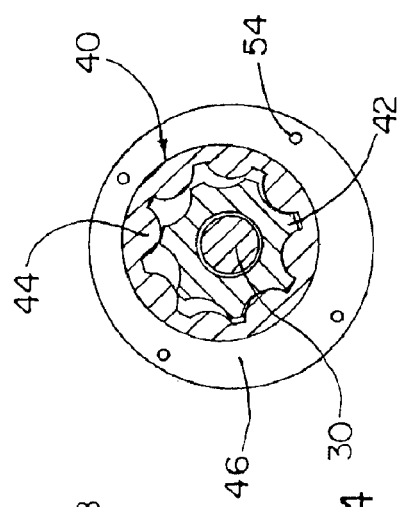
FIG. 4 is cross section taken along lines 4—4 of FIG. 3, showing fluid passages through an eccentric spacer of the gerotor pump.
Figure 3:
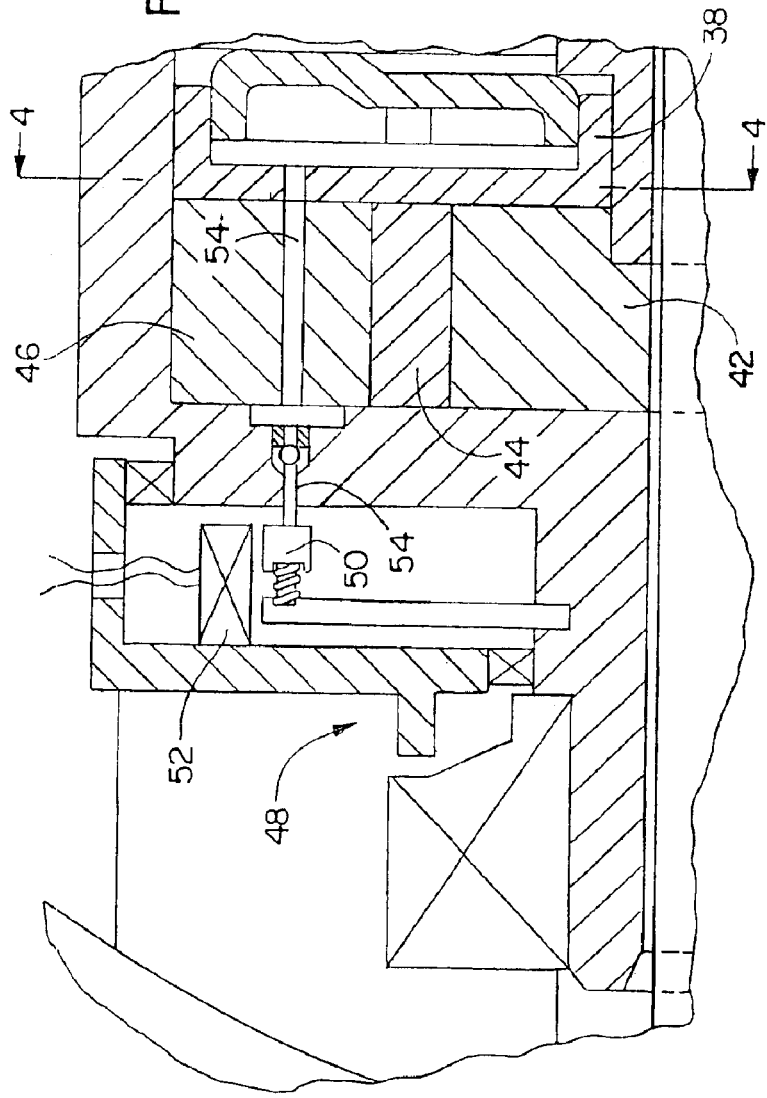
FIG. 3 is an enlarged partial cross section of a second embodiment of my invention having the solenoid operated valve of FIGS. 1 and 2 located in the differential case at a point outboard of the outer gear of a gerotor pump.

FIG. 3 shows a second embodiment of my invention in which the outlet passage 54 is disposed radially outboard of the outer gear 44 of the gerotor pump 40, and extends through the piston housing 38 and the eccentric spacer 46, as shown in FIG. 4. Except for the location of the outlet passage 54 and its extension through the eccentric spacer 46 and piston housing 38, the embodiment of FIGS. 3 and 4 is essentially identical to the embodiment of FIGS. 1 and 2.

In the configurations shown herein, in FIGS. 1–3, the spring 66 is a compression spring urging the push rod 62 toward a preload position whereat the push rod 62 urges the ball 58 into seated engagement with the valve seat 56, and the solenoid valve is configured such that the axial force generated on the armature 50 by flowing electrical current through the actuating coil 52 aids the preload spring 66 in urging the ball 58 to move in a direction toward the valve seat 56. With this configuration, the solenoid operated valve 48 functions as a normally closed relief valve, with the relief pressure being selectively variable as a function of how much electrical current is flowing through the actuating coil 52. The pressure inside of the piston chamber 37 can be controlled while the differential 10 is operating, to vary the clamping force on the clutch pack 34 and thereby the percentage of slip allowed in the differential 10, by adjusting the current flowing through the actuating coil 52, to regulate the amount of force generated by the armature 50 aiding the preload spring in resisting a release of fluid through the outlet passage 54. This provides considerable advantage over prior differentials having fixed preload spring rates, which had to be disassembled and reassembled with a preload spring having a different rate, in order to change the pressure setting in the piston chamber.

In other embodiments of my invention it may be desirable to utilize other arrangements that would provide a normally open valve, having the force generated by the armature opposing the preload spring and urging the ball toward engagement with the valve seat. In yet other embodiments, it may be desirable to provide a normally closed valve, where the force generated by the solenoid opposes the preload spring and urges the ball to move away from the valve seat. Other arrangements are also contemplated for modulating the amount of fluid released through the outlet passage 54 by a solenoid valve according to my invention.

While the embodiments of my invention disclosed herein are presently considered to be preferred, various changes and modifications can be made without departing from the spirit and scope of the invention. For example, it may be desirable to have multiple armatures, etc., disposed in a plurality of outlet passages 54 spaced around the periphery of the piston 36, all controlled by a common actuating coil 52, as indicated in FIG. 3.

The scope of the invention is indicated in the appended claims, and all changes or modifications within the meaning and range of equivalents are intended to be embraced therein.

I claim:
1. A differential comprising:
   a non-rotating differential housing;
   a differential case rotatably mounted within the housing and adapted to be driven by an input shaft;
   a differential gear assembly mounted within the differential case and adapted for attachment to a pair of output shafts for allowing differential rotational speed between the output shafts;
   a hydraulically actuated limited slip device disposed within the differential case for retarding differential rotational speed between the output shafts, wherein the differential case includes an outlet passage for the hydraulically actuated limited slip device;
   a solenoid operated valve for selectively modulating fluid flow through the outlet passage as a function of electrical current passed through an actuating coil, the solenoid valve comprising:
      an armature attached to the differential case for rotation therewith, wherein the actuating coil is operatively attached to the non-rotating differential housing, with the armature operatively attached to the hydraulically actuated limited slip device for modulating pressure in the limited slip device;
      a valve seat in the outlet passage;
      a ball retained in the outlet passage adjacent the seat and configured for seated engagement with the valve seat; and
      a push rod affixed to the armature for movement therewith, and extending through the outlet passage for sliding movement with respect thereto, and contacting the ball for regulating a position of the ball in relation to the valve seat.

2. The differential of claim 1 further comprising a plenum for hydraulic fluid attached and fixed against rotation in relation to the differential housing and sealed in fluid communication with the hydraulically actuated limited slip device for receiving fluid from the solenoid operated valve.

3. The differential of claim 2 wherein the actuating coil of the solenoid operated valve is fixedly attached to the plenum.

4. The differential of claim 1 wherein:
   the hydraulically actuated limited slip device further includes a gerotor pump having an inner gear adapted for attachment to one of the output shafts for rotation therewith and an outer gear attached to the differential case for rotation relative to the inner gear and the differential case; and
   the outlet passage is disposed adjacent an intersection of the inner and outer gears of the gerotor pump.

5. The differential of claim 1 wherein:
   the hydraulically actuated limited slip device further includes a gerotor pump having an inner gear adapted for attachment to one of the output shafts for rotation therewith and an outer gear attached to the differential case for rotation relative to the inner gear and the differential case; and the outlet passage is disposed outside of the outer gear of the gerotor pump.

6. The differential of claim 1 further comprising a retaining device attached to the differential case for retaining the push rod in the outlet passage.

7. The differential of claim 6 further including a preload spring operatively disposed between the retaining device and the push rod for urging the push rod toward a preload position in the outlet passage.

8. The differential of claim 7 wherein the preload spring urges the push rod toward the preload position whereat the push rod holds the ball in seated engagement with the valve seat, and the solenoid operated valve generates a force aiding the preload spring in urging the pushrod toward the preload position when electrical current is passing through the actuating coil.

9. A solenoid operated valve apparatus for a differential having a differential gear assembly mounted within a rotatable differential case and adapted for attachment to a pair of output shafts for allowing differential rotational speed between the output shafts, and a hydraulically actuated limited slip device disposed within the differential case for retarding differential rotational speed between the output shafts, the valve apparatus comprising:

an armature attached to the differential case for rotation therewith, and operatively attached to the hydraulically actuated limited slip device for modulating pressure in the limited slip device the differential case including an outlet passage for the hydraulically actuated limited slip device;

an actuating coil adapted for attachment to a non-rotating support for actuating the armature;

a valve seat in the outlet passage;

a ball retained in the outlet passage adjacent the seat and configured for seated engagement with the valve seat; and a push rod affixed to the armature for movement therewith, and extending through the outlet passage for sliding movement with respect thereto, and contacting the ball for regulating a position of the ball in relation to the valve seat;

wherein the solenoid operated valve apparatus is arranged to selectively modulate fluid flow through the outlet passage as a function of electrical current passed through the actuating coil.

10. The solenoid operated valve apparatus of claim 9, further comprising:

a retaining device attached to the differential case for retaining the push rod in the outlet passage; and a preload spring operatively disposed between the retaining device and the push rod for urging the push rod toward a preload position in the outlet passage.

11. The solenoid operated valve apparatus of claim 10 wherein the preload spring urges the push rod toward the preload position whereat the push rod holds the ball in seated engagement with the valve seat, and the armature generates a force aiding the preload spring in urging the pushrod toward the preload position when electrical current is passing through the actuating coil.

12. The solenoid operated valve apparatus of claim 9 further comprising a plenum for hydraulic fluid fixed against rotation with respect to the actuating coil and sealed in fluid communication with the hydraulically actuated limited slip device for receiving fluid from the solenoid operated valve.

13. The solenoid operated valve apparatus of claim 12 wherein the actuating coil of the solenoid operated valve is fixedly attached to the plenum.

* * * * *